July 27, 1948.　　　D. L. A. DRIVER　　　2,445,768
MANUFACTURE OF SELENIUM PRODUCTS

Filed May 30, 1945　　　2 Sheets-Sheet 1

Inventor
Douglas Louis Ashton Driver
By
Attorney

July 27, 1948. D. L. A. DRIVER 2,445,768
MANUFACTURE OF SELENIUM PRODUCTS
Filed May 30, 1945 2 Sheets-Sheet 2

Inventor
Douglas Louis Ashton Driver
By
Attorney

Patented July 27, 1948

2,445,768

UNITED STATES PATENT OFFICE 2,445,768

MANUFACTURE OF SELENIUM PRODUCTS

Douglas Louis Ashton Driver, London, England, assignor to Standard Telephones and Cables Limited, London, England, a British company Application May 30, 1945, Serial No. 596,697
In Great Britain May 5, 1944

Section 1, Public Law 690, August 8, 1946
Patent expires May 5, 1964

3 Claims. (Cl. 154—46M)

The invention relates to an improved method of processing selenium by which it is obtained in a new form.

When selenium is employed in the manufacture of electric rectifiers or photo-electric cells, it is usually applied to metal base plates in the form of powder which is spread over the plates and then subjected to heat and pressure to form an adherent coating.

According to the present invention the selenium is provided in the form of a felted mass of fibres something like glass wool. This kind of selenium felt or wool may be manufactured in continuous sheets or strips of any desired thickness. Discs or other suitably shaped pieces may be cut from the felt. These pieces may be of the proper size to be pressed directly on the base plates to form the desired coatings for rectifiers or photo-electric cells, which are subsequently processed and completed according to any of the well known methods.

The selenium felt or wool may be produced according to the invention by spraying molten selenium from one or more nozzles by air or gas under pressure. The selenium forms into fibres immediately on extrusion from the nozzles, and the fibres mat together to form a loosely felted mass of wool. As will be explained in detail below, the spraying apparatus may be similar to that used for flameless metal spraying. The spraying nozzles consist of a narrow inner pipe, the mouth of which is surrounded by an annular nozzle to which compressed air is supplied for ejecting the selenium, and the supply of selenium to the inner pipe may be controlled by a needle valve.

The invention will be explained with reference to the accompanying drawings in which:

Fig. 4 shows a top view of part of a strip of selenium felt which has been sprayed on to a metal plate; and Fig. 5 shows a transverse section of Fig. 4.

Figure 1:
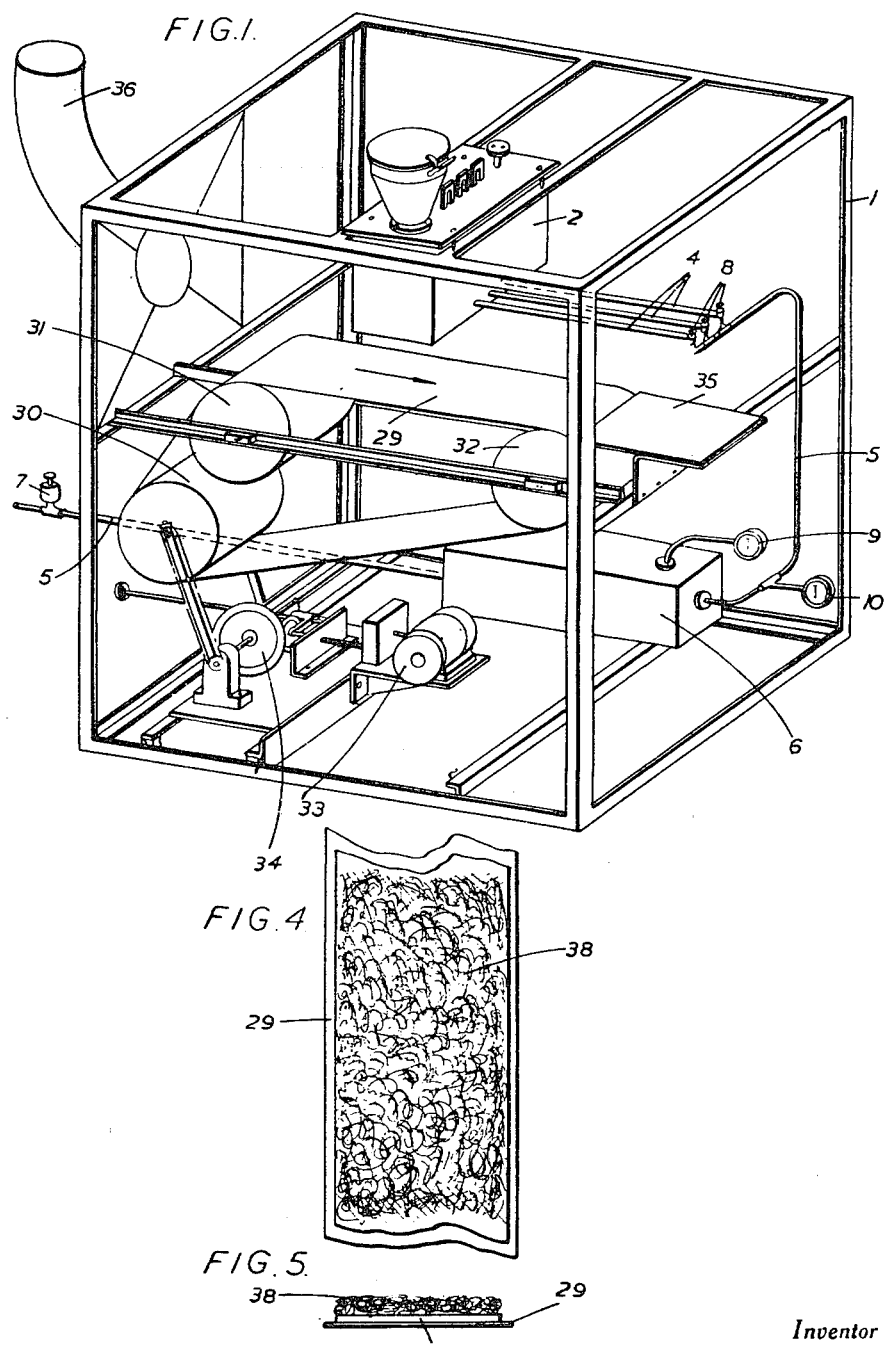
Fig. 1 shows a perspective view of apparatus for producing selenium felt or wool according to the invention.
Figure 2:
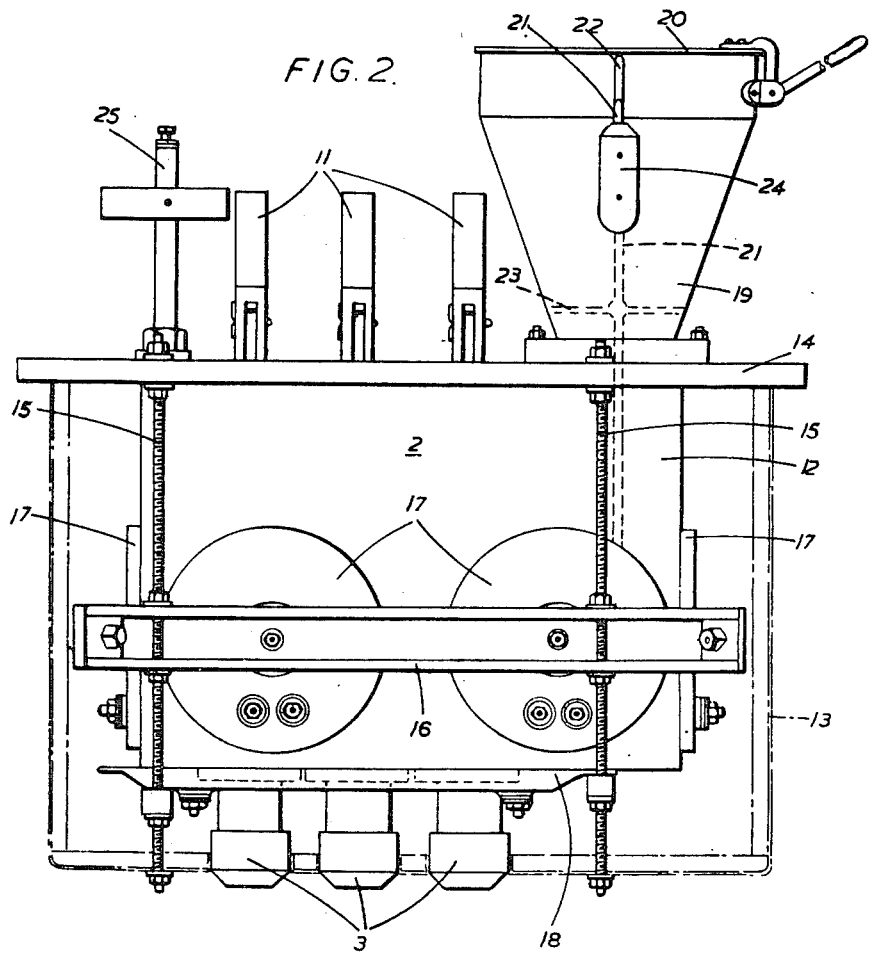
Fig. 2 shows a side view of the device from which the selenium is sprayed.

A perspective view of an apparatus for producing the selenium felt is shown in Fig. 1 of the accompanying drawings, and Fig. 2 shows details of the device from which the selenium is sprayed to form the felt.

The apparatus is mounted in an enclosure built round a rectangular frame 1 of angle-iron. The top and sides of the enclosure have been removed in order to show the internal parts. Supported from the top of the frame on transverse bars is the selenium sprayer 2 which comprises an electrically heated hollow metal tank, details of which are shown in Fig. 2. Three or other suitable number of spraying nozzles 3 (not visible in Fig. 1) are fixed through the bottom of the sprayer tank. The selenium is heated in the tank to a temperature above 220° C. so as to maintain it in a molten condition, and is blown through the nozzles by compressed air supplied from pipes 4 (Fig. 1) each fed from a main air pipe 5 which passes through a heating box 6. The main air supply is controlled by a reduction valve 7 and individual needle valves 8 control the air supply to the pipes 4. A thermometer 9 and pressure gauge 10 are provided for the main air supply. Individual needle valves 11 (Fig. 2) are provided for the nozzles 3 to control the supply of the melted selenium.

The selenium sprayer shown in Fig. 2 comprises a metal tank 12 fixed inside a jacket 13 lagged with asbestos wool or the like. The tank and jacket are attached to the top plate 14 by rods 15 which also support metal strips 16 forming a rectangular frame surrounding the tank 12 and supporting a number of electric heating coils 17 against the sides of the tank 12. Additional heating strips 18 are provided underneath the tank. A hopper 19 is provided for loading the selenium into the tank and is closed by a lid 20. A dip-stick is provided for measuring the quantity of selenium in the tank. This consists of a wire 21 dipping down into the tank and hooked through a slot 22 in the top rim of the hopper 20. The wire 21 carries a disc shown dotted at 23 which closes the lower end of the hopper; and a handle 24 is also provided for the dip-stick. A thermostat 25 dipping into the tank 12 is provided for controlling the temperature of the selenium.

Figure 3:
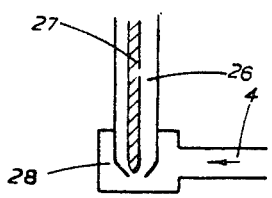
Fig. 3 shows a detail of the spraying nozzle.

Details of the nozzles 3 are shown in Fig. 3. Each consists of an inner pipe 26 having a small orifice at its lower end which can be closed by a needle 27. Surrounding the lower end of the pipe 26 is an annular jacket 28 having a small orifice opposite the end of the pipe 26. The air pipe 4 leads into this jacket 28. The selenium is fed into the inner pipe 26, and the air blown through the pipe 4 ejects it through the lower orifice and it solidifies almost immediately into a fibre. By raising or lowering the needle 27, the supply of selenium may be regulated or cut off.

Referring again to Fig. 1, an endless band 29 is driven continuously in the direction of the arrow over rollers 30, 31 and 32 by means of an electric motor 33. The drive includes a variable speed gear 34 by which the velocity of the band may be adjusted. The horizontal portion of the band travels beneath the nozzles 3 of the sprayer 2. The selenium emerging from the nozzles solidifies into fine fibres which consolidate upon the band and form a loosely matted felt like that shown in Figs. 4 and 5. The thickness of the felt depends on the number of nozzles, on the rate at which the selenium is sprayed, and on the velocity of the band 26. A fixed horizontal platform 35 placed close to the band 29 where it turns down over the edge of the roller 32 is employed to intercept the strip of felt which is continuously formed, and to direct it out of the apparatus. An exhaust flue 36 is provided to remove undesirable fumes from the inside of the apparatus.

The spacing of the nozzles 3 and their distance from the band 29 should be adjusted so that a selenium felt of even thickness is obtained.

The felt or wool manufactured in this manner may be stored in rolls if desired, and may be cut up into discs of the proper size and shape for pressing directly on to the metal base-plates in the manufacture of rectifiers or photo-electric cells.

As an alternative process, the metal base-plates may be fed from the left hand side on to the band 29 (Fig. 1) and may be covered directly with the selenium felt as they pass under the nozzles 3, or a large piece of sheet metal may be passed under the nozzles on the band (or by other means) and may be covered with a layer of felt of suitable thickness which is afterwards pressed on to the sheet to form the desired selenium coating. The covered metal sheet may then be cut into discs of the desired size. Figs. 4 and 5 show such a metal sheet 37 covered with a layer of felt 38 and supported on the travelling band 29.

The pressing of the selenium felt on to the base plate takes place in a press at a suitable temperature for obtaining the selenium coating in the desired form, the process being similar to that employed when the selenium is applied to the plates in the form of powder, except that the pressing time is different and generally shorter under otherwise similar conditions. The pressing may for example take place at temperatures between about 100° C. and 145° C. at pressures between about 800 and 6000 pounds per sq. inch, the necessary pressing times varying between about ¾ and 5 minutes.

After coating the base plate in this manner the selenium may be further heat treated according to the usual practice in order to produce the desired properties, and the counterelectrode is then applied over the selenium coating. In the case of a photo-electric cell, this counterelectrode will, of course, be of a transparent or translucent nature.

What is claimed is:

1. A felted mass of selenium fibres.
2. A sheet of felt formed of selenium fibres loosely matted together.
3. A wool composed of fine fibres of selenium.

DOUGLAS LOUIS ASHTON DRIVER.

REFERENCES CITED

The following references are of record in the file of this patent:

UNITED STATES PATENTS

| Number | Name | Date |
| --- | --- | --- |
| 1,807,178 | Seil | May 26, 1937 |
| 2,189,840 | Simison | Feb. 13, 1940 |
| 2,219,346 | Thomas et al. | Oct. 29, 1940 |
| 2,317,173 | Bleakley | Apr. 20, 1943 |
| 2,334,554 | Hewlett | Nov. 16, 1943 |
| 2,342,278 | Herrmann | Feb. 22, 1944 |
| 2,345,834 | Schweitzer | Apr. 4, 1944 |
| 2,354,109 | Flood | July 18, 1944 |

OTHER REFERENCES

General Inorganic Chemistry by Sneed, published by Ginn & Co., New York, 1926, page 268. (Copy in Div. 5.)